United States Patent [19]

Suzuki

[11] Patent Number: 4,709,259
[45] Date of Patent: Nov. 24, 1987

[54] COLOR IMAGE SENSOR

[75] Inventor: Kenji Suzuki, Kanagawa, Japan

[73] Assignee: Fuji Photo Film Co., Ltd., Kanagawa, Japan

[21] Appl. No.: 860,791

[22] Filed: May 8, 1986

[30] Foreign Application Priority Data

May 8, 1985 [JP] Japan ................................. 60-96065
May 8, 1985 [JP] Japan ................................. 60-96066

[51] Int. Cl.[4] ....................... H04N 9/07; H04N 9/077
[52] U.S. Cl. ......................................... 358/48; 358/44
[58] Field of Search ........................ 358/48, 44, 43, 41

[56] References Cited

U.S. PATENT DOCUMENTS

| | | | |
|---|---|---|---|
| 4,117,510 | 9/1978 | Ohta et al. | 358/44 |
| 4,277,799 | 7/1981 | Koike et al. | 358/48 X |
| 4,281,338 | 7/1981 | Takahashi et al. | 358/48 X |
| 4,504,865 | 3/1985 | Nishizawa et al. | 358/213 |
| 4,580,160 | 4/1986 | Ochi et al. | 358/44 X |
| 4,658,287 | 4/1987 | Chen | 358/48 |

FOREIGN PATENT DOCUMENTS

| | | | |
|---|---|---|---|
| 0157660 | 10/1985 | European Pat. Off. | 358/48 |
| 53-70625 | 6/1978 | Japan | 358/48 |
| 59-19493 | 1/1984 | Japan | 358/44 |
| 2117206 | 10/1983 | United Kingdom . | |

OTHER PUBLICATIONS

Aoki et al, "MOS Color Imaging Device", Feb. 13, 1980, pp. 26-28.

Koike et al, "MOS Area Sensor", Aug. 1980, pp. 1676-1681.

Nabeyama, "All Solid State Color Camera with Single-Chip MOS Imager", Feb. 1981, pp. 40-46.

Primary Examiner—Michael A. Masinick
Assistant Examiner—E. Anne Faris
Attorney, Agent, or Firm—Young & Thompson

[57] ABSTRACT

A color image sensor has: photodiodes for the color blue for converting blue light into a charge signal and storing it; photodiodes for the color green for converting green light into a charge signal and storing it; and photodiodes for the color red for converting red light into a charge signal and storing it, the blue, green and red photodiodes being arranged in a matrix. Three vertical lines are provided for each column to pick up the charge signals stored in the photodiodes via vertical MOS switches. The vertical MOS switches are serially connected to respective horizontal MOS switches which are turned on by a horizontal scan shift register. If the concurrent readout of color signals is not used, a single horizontal scan shift register is used. For sequentially turning on the vertical MOS switches for each color, three vertical scan shift registers are provided. By varying the operating timings of the three vertical scan shift registers, the charge storage time for each color can be controlled. The photodiodes in the matrix are grouped into units each comprised by M rows and N columns. A single-pixel measuring unit is comprised by one grouped unit. Within the same grouped unit, the same color signals are added together and thereafter picked up.

8 Claims, 8 Drawing Figures

COLOR IMAGE SENSOR

BACKGROUND OF THE INVENTION

The present invention relates to a color image sensor for reading a color image, and more particularly to a color image sensor suitable for use as a scanner of a color printer.

A recent color printer is provided with a scanner for scanning a color original (color negative film, color positive film and the like. To reproduce a color print having proper densities and well-balanced colors, three color densities of the color original are measured at each point of the color original to control the exposure quantities of red, green and blue colors at the time of printing a color paper on the basis of the measured three color densities. A color image sensor or a solid state image sensor is used in the scanner, which may be either a three-image sensor type scanner or a single-image sensor type scanner: the former type of scanner is provided with three color image sensors, e.g., red, green and blue color image sensors for each color to be measured, and the latter type of scanner is provided with a single image sensor and a mosaic or stripe filter which is disposed at the light receiving surface of the single image sensor and has red, green and blue color transmission areas disposed alternately to each other.

The three-image sensor type scanner requires not only three color image sensors but also three sets of drivers and optical systems, thus resulting in a complicated structure and a high cost. Therefore, a single-image sensor type scanner is more advantageous in view of the cost and the space required for mounting the scanner. In the single-image sensor type scanner which has already been adopted in a color TV camera, three color signals for each pixel are mixed and collected by the scanner. However, in a color printer, it is necessary for a computer to be supplied with a color signal separated for each color in order to calculate the exposure quantity of each color. Therefore, in the case where a single-image sensor type color scanner is used for color printing, a color separation circuit of a complicated structure, which operates in synchro with reading of the color image sensor, is required between the color image sensor and the computer.

In measuring the three color densities of a color original with a single-image sensor type color scanner, shear in color registration is generated inevitably since each photoelectric conversion unit measures a different point. Consequently, a correct measurement of each pixel is not possible. This becomes a problem when the three color exposure quantities are controlled taking the hue of each pixel into consideration.

Generally speaking, color negative films made by an amateur include adequately exposed frames, over-exposed frames or under-exposed frames. Thus, a dynamic range of about 10,000 steps is necessary for measuring the density of an image of a color negative film. However, the dynamic range of a color image sensor is narrow, so that if 10,000 steps are to be covered, a change in single level due to a change in incident light must be suppressed, which makes it impossible to measure the density with high accuracy. Apart from the above, if a single frame is here considered, a dynamic range of about 100 steps can suffice for each color although the signal level differs for each color. Therefore, if the density is measured by changing the charge storage time for each color, the dynamic range is substantially widened so that a signal with less noise can be obtained.

OBJECTS OF THE INVENTION

It is therefore an object of the present invention to provide a color image sensor of a single image sensor type in which plural types of photoelectric conversion units are alternately disposed, each photoelectric conversion unit photoelectrically converting a different color light into a charge signal and storing it, wherein a color signal corresponding to the charge signal can be read separately from each color signal.

It is another object of the present invention to provide a color image sensor with reduced shear in color registration.

It is a further object of the present invention to provide a color image sensor capable of obtaining a signal with reduced noise by setting a charge storage time independently of each color to widen the dynamic range.

SUMMARY OF THE INVENTION

To achieve the above main objects of the present invention, the color image sensor of the invention is provided with readout means for reading the charge signals stored in respective photoelectric conversion units in the form of a color-separated signal.

According to a preferred embodiment of the present invention, the photoelectric conversion units disposed in a matrix fashion are grouped into a plurality of single-pixel measuring units, each unit comprising $M \times N$ (M and N are integers equal to at least 3) photoelectric conversion units. Within each single-pixel measuring unit, n (minimum common divisor of $M \times N$, equal to at least 3) photoelectric conversion units are included for each color. The charge signals stored in n photoelectric conversion units are added and read. To effect addition of the charge signals in a single-pixel measuring unit, respective vertical MOS switches connected to n photoelectric conversion units are simultaneously turned ON and at the same time a single horizontal MOS switch connected to the n vertical MOS switches is turned ON. To simplify the circuit construction, a single vertical scan shift register for turning ON vertical MOS switches and a single horizontal scan shift register for turning ON horizontal MOS switches are provided to simultaneously read the charge signals for each color.

According to another preferred embodiment of the present invention, to enable a high precision measurement by setting a storage time (photoelectric conversion time) for each color to widen the dynamic range, a vertical scan shift register is provided for each color. Each vertical scan shift register operates independently from the others and turns ON vertical MOS switches at a different timing for each color thereby to terminate the storage of the charge signals. A horizontal MOS switch connected serially to vertical MOS transistors is controlled to turn ON or OFF by the horizontal scan shift register which may be provided for each color or used commonly for all colors. In the case of a single horizontal scan shift register, a simple circuit construction and a low cost can be enjoyed. However, vertical scan shift registers provided for respective colors cannot be operated simultaneously. Therefore, the vertical scan shift registers are selectively operated for reading the charge signals for each color. Grouping of the photoelectric conversion units in units of M×N is effective in eliminating shear in color registration.

Various combinations such as blue, green and read, or cyan, magenta and yellow may be used as the colors to which the present invention is applicable. Specific colors such as a flesh tint color may be used.

DETAILED DESCRIPTION OF THE INVENTION

Figure 1:
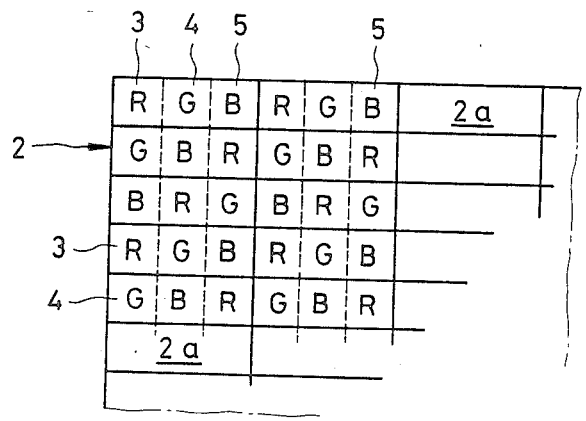
FIG. 1 is an explanatory view of the arrangement of photoelectric conversion units of the color image sensor according to the present invention.

Referring now to FIG. 1 showing an embodiment of the arrangement of photoelectric conversion units of a color image sensor, the sensor 2 has alternately and regularly disposed red color photoelectric conversion units 3 for converting red light into a charge signal and storing it, green color photoelectric conversion units 4 for converting green light into a charge signal and storing it, and blue color photoelectric conversion units 5 for converting blue light into a charge signal and storing it. The red, green and blue color photoelectric conversion units 3, 4 and 5 are each constructed of, as well known in the art, an equivalent photodiode and a color filter for selectively transmitting a specific color. In this embodiment, red, green and blue filters are used as the color filters. The red color photoelectric conversion unit 3 is constructed of a red filter and a photodiode, the green color photoelectric conversion unit 4 is constructed of a green filter and a photodiode, and the blue color photoelectric conversion unit 5 is constructed of a blue filter and a photodiode. To measure three colors separately, a single-pixel measuring unit 2a is constructed of three photoelectric conversion units 3, 4 and 5 disposed laterally. In FIG. 1, the single-pixel measuring unit 2a is enclosed with a solid line, while each photoelectric conversion unit 3, 4 and 5 is bounded by a dotted line. The single-pixel measuring unit 2a may be constructed of three photoelectric conversion units 3, 4 and 5 disposed vertically or slantwise. Although only a portion of the photoelectric conversion units is shown in FIG. 1, actually a large number of photoelectric conversion units 3, 4 and 5 are disposed in a matrix fashion.

Figure 2:
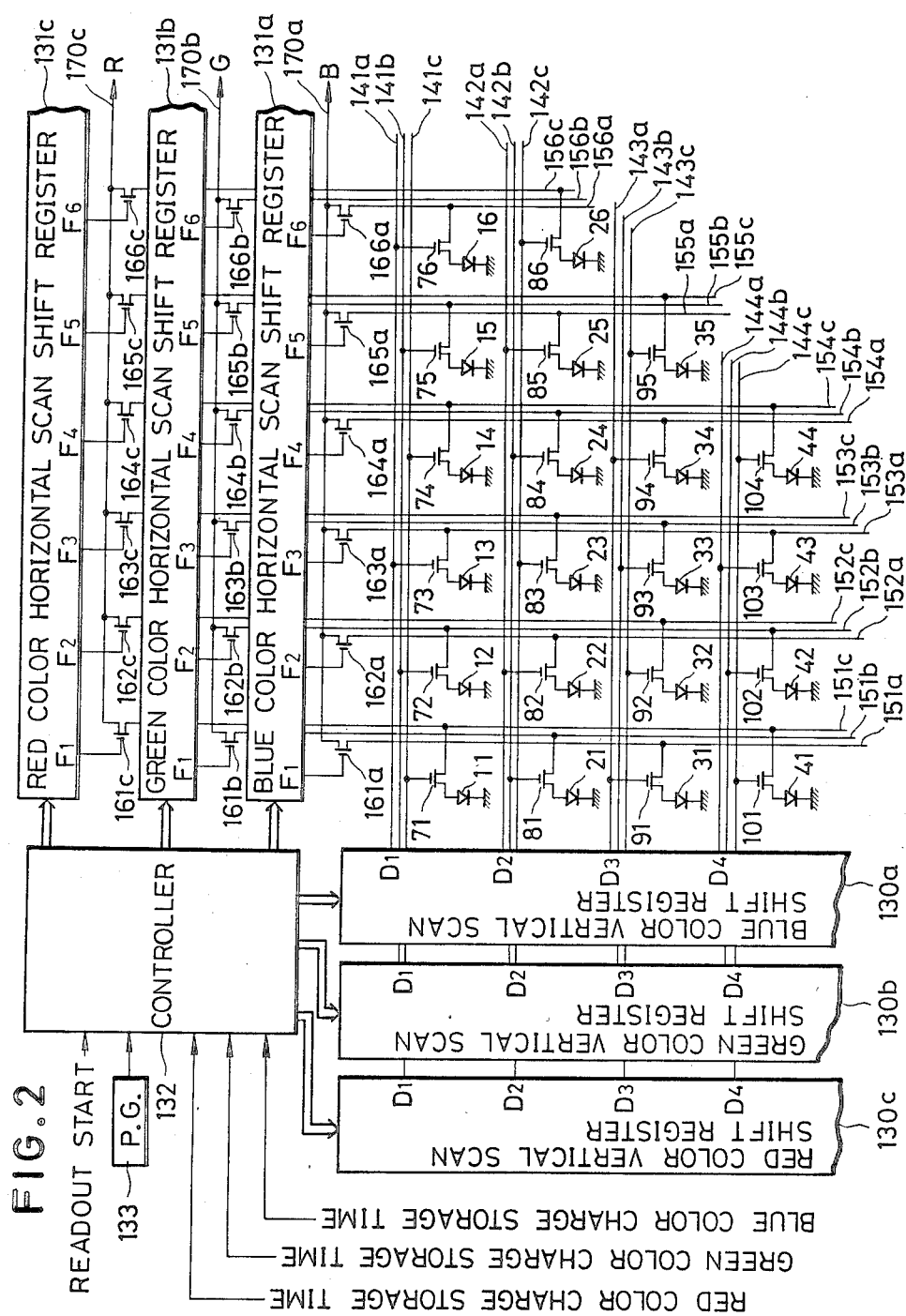
FIG. 2 is a circuit diagram of the color image sensor according to the present invention, wherein vertical shift registers and horizontal shift registers are provided for respective colors and the charge storage time for each color can be varied.

FIG. 2 shows an embodiment of the color image sensor of the invention, wherein a single-pixel measuring unit is constructed of a single photoelectric conversion unit for each color and the charge storage time for each color can be varied. In an actual color image sensor, each electric element is integrally provided on a semiconductor chip. However, in the figure, equivalent electric elements are used to represent such actual elements. Photodiodes 11 to 16, 21 to 26, 31 to 35, and 41 to 44 are disposed in a matrix fashion for photoelectrically converting light through the above-noted color filter into a charge signal. The charge signal obtained through photoelectric conversion is stored in a floating capacitor. Photodiodes 11, 14, 23, 26, 32, 35, 41 and 44 are for red. Photodiodes 12, 15, 21, 24, 33 and 42 are for green. Photodiodes 13, 16, 22, 25, 31, 34 and 43 are for blue. To read charge signals stored in these photodiodes, vertical MOS switches 71 to 76, 81 to 86, 91 to 95, and 101 to 105 are serially connected to respective photodiodes.

To conduct a high precision measurement by widening the dynamic range, vertical scan means is provided for each color in this embodiment. In particular, to vertically scan each color, a blue vertical scan shift register 130a, green vertical scan shift register 130b, and red vertical scan shift register 130c are provided. In addition, to enable an independent readout for each color, e.g., to enable a concurrent readout for both red and green signals during some time, a blue horizontal scan shift register 131c, green horizontal scan shift register 131b, and red horizontal scan shift register 131c are provided. The respective shift registers 130a to 130c and 131a to 131c are controlled by a controller 132. Reference numeral 133 designates a pulse generator for supplying pulses to the controller 132.

To scan the first row of the photoelectric conversion units, a blue horizontal line 141a, green horizontal line 141b, and red horizontal line 141c are provided, which are respectively connected to output terminal D1 of the blue vertical scan shift register 130a, output terminal D1 of the green vertical scan shift register 130b, and output terminal D1 of the red vertical scan shift register 130c. The gates of blue vertical MOS switches 73 and 76 are connected to the blue horizontal line 141a, the gates of green vertical MOS switches 72 and 75 are connected to the green horizontal line 141b, and the gates of red vertical MOS switches 71 and 74 are connected to the red horizontal line 141c. The same circuit arrangement is provided for the second and following rows of the photoelectric conversion units, so the description thereof is omitted although the corresponding reference numerals are shown in FIG. 2.

A blue vertical line 151a, green vertical line 151b, and red vertical line 151c are disposed side by side along the first column of the photodiodes and connected to the corresponding drains of the vertical MOS switches. Three vertical lines 152a to 152c for respective colors are also disposed side by side along the second column of the photodiodes. The same arrangement is used for the third and following columns so that the description thereof is omitted although again the reference numerals are shown in FIG. 2.

The blue vertical lines 151a, 152a, 153a, 154a, 155a and 156a are connected to the respective sources of blue horizontal MOS switches 161a, 162a, 163a, 164a, 165a, 166a. The gates of these blue horizontal MOS switches are connected to the respective output terminals F1 to F5 of the blue horizontal scan shift register 131a. The drains of the blue horizontal MOS switches 161a, 162a, 163a, 164a, 165a, and 166a are connected to a blue output line 170a.

Similarly, the green vertical lines 151b, 152b, 153b, 154b, 155b and 156b are connected to the respective sources of green horizontal MOS switches 161b, 162b, 163b, 164b, 165b and 166b. The gates of these green horizontal MOS switches are connected to the respective output terminals F1 to F5 of the green horizontal scan shift register 131b. The drains of the green horizontal MOS switches 161c, 162c, 163c, 164c, 165c and 166c are connected to a green output line 170b.

Furthermore, the red vertical lines 151c, 152c, 153c, 154c, 155c, and 156c are connected to the respective sources of red horizontal MOS switches 161c, 162c, 163c, 164c, 165c and 166c. The gates of these red horizontal MOS switches are connected to the respective output terminals F1 to F5. The drains of the red horizontal MOS switches 161c, 162c, 163c, 164c, 165c and 166c are connected to a red output line 170c.

Figure 3:
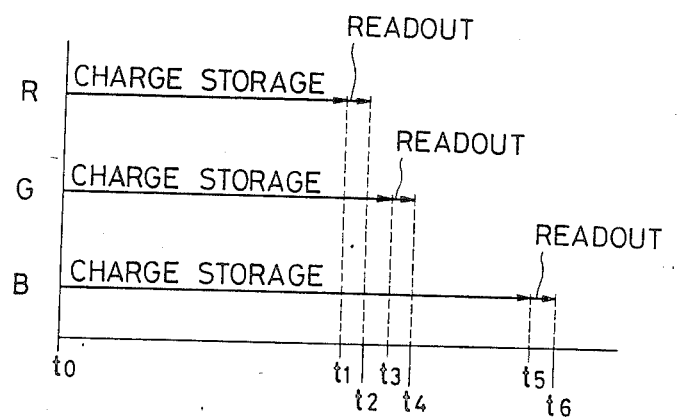
FIG. 3 is a timing chart showing the charge storage and signal readout of the embodiment shown in FIG. 2.

Next, the operation of the above embodiment will be described with reference to FIG. 3. First, red, green and blue storage times are assigned to the controller 132. The charge storage times (photoelectric conversion times) are determined so that the maximum value obtained by measuring each color during pre-scan or the like approaches the saturation output value. When a readout start signal for a main scan is inputted to the controller 132, respective charge signals stored in the floating capacitors are scanned by the vertical scan shift registers 130a to 130c and the horizontal scan shift registers 131a to 131c, and simultaneously read to rest to time t0. These read-out signals are not needed so that they are not inputted to the computer but drained.

After time t0, each photodiode converts incident light into a charge signal and stores it. At time t1, the red charge storage is complete. Then, the controller 132 sends clock pulses to the red vertical scan shift register 130c and red horizontal scan shift register 131c to sequentially scan the red photodiodes and read the charge signals stored therein. More particularly, the red vertical scan shift register 130c outputs a shift pulse from the first output terminal D1 to supply it to the red horizontal line 141c. In this state, the red horizontal scan shift register 131c scan once to sequentially turn ON the red MOS switches 161c to 166c. The charge signals stored in the red photodiodes 11 and 14 in the first row are sequentially read as analog signal, which in turn are sent via the red output line 170c to an A/D converter (not shown) where they are converted into digital signals. The digital signals are sent to a logarithm conversion table (not shown) where they are subjected to logarithmic conversion. In this lagarithmic conversion a page corresponding to the charge storage time is selected to convert the digital signals into correct density values suitable for the respective charge storage times. The density values are inputted to the computer.

After completion of the readout of the red photodiodes in the first row, the red vertical scan shift register 130c outputs a shift pulse from the second output terminal D2. In this state, the red horizontal scan shift register 131c scans once as described above to read the charge signals stored in the photodiodes in the second row. Similarly, the red photodiodes in the third and following rows are scanned to sequentially read the red charge signals. The red charge signal readout continues during time t1 to time t2.

At time t3 the charge storage for green is complete. Then the controller 132 outputs a shift pulse to the green vertical scan shift register 130b and green horizontal scan shift register 131b to sequentially scan the green photodiodes and read the stored charge signals during time t3 to t4.

At time t5 the charge storage for blue is complete. Then, the blue photodiodes are sequentially scanned by the blue vertical scan shift register 130a and the blue horizontal scan shift register 131a. The stored charge signals are read during time t5 to t6.

Figure 4:
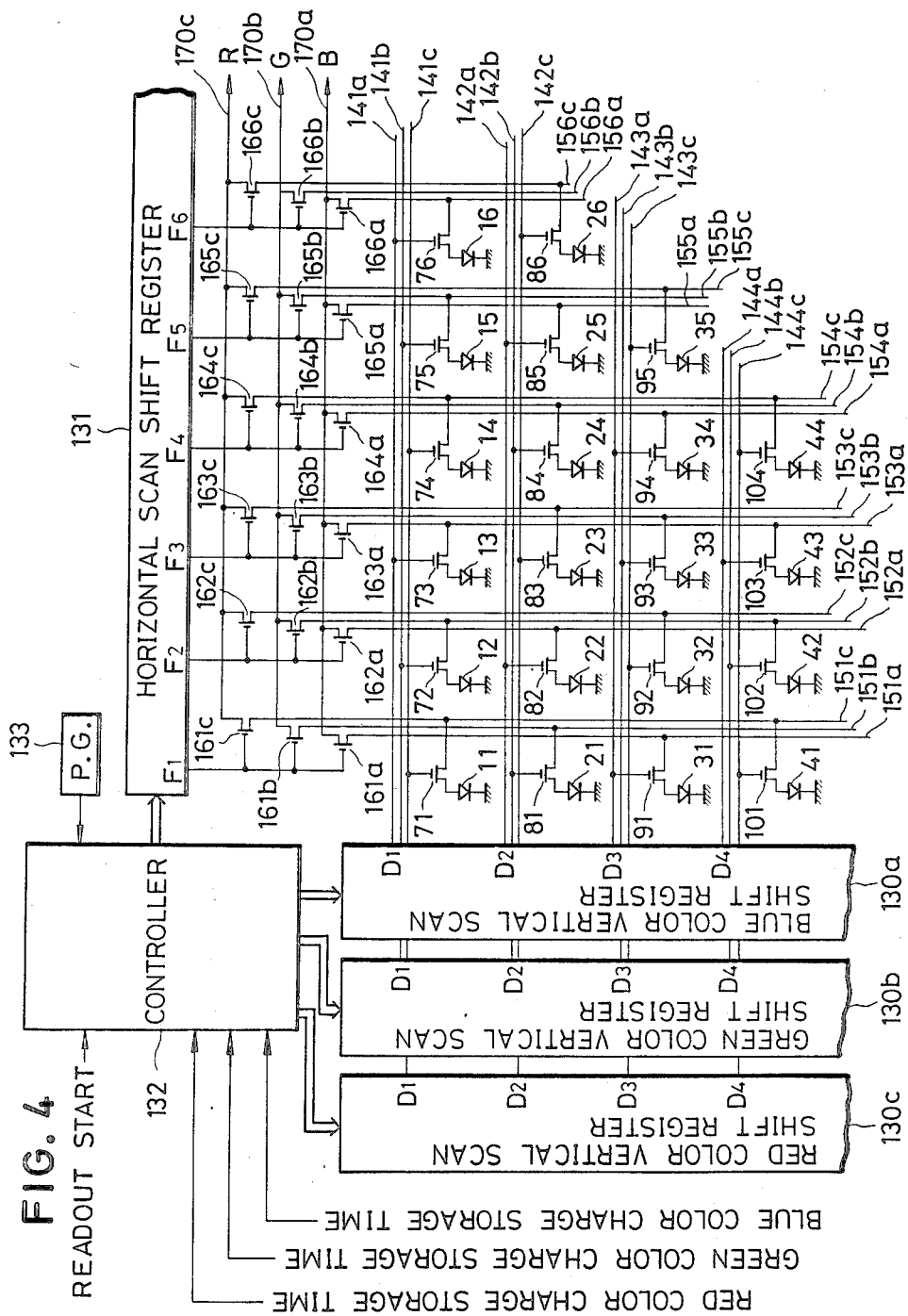
FIG. 4 is a circuit diagram of the color image sensor according to the present invention, which is a modification of the embodiment shown in FIG. 2 and wherein vertical scan shift registers are provided for respective colors and a horizontal scan shift register is commonly used for all colors.

In the case in which the concurrent readout for respective colors does not occur, a single horizontal scan shift register can be commonly used, resulting in a simple circuit arrangement and low cost. FIG. 4 shows such an embodiment, wherein substantially the same elements as those of FIG. 2 have been designated by identical references. The single horizontal scan shift register 131 operates three times to read respective color signals. The other operations are substantially the same as those in FIG. 2, so the description thereof is omitted. Although horizontal MOS switches are provided for each color, other modifications are possible. For example, only one horizontal MOS switch may be used to couple three vertical lines together. In this case, three 3 color signals are read from the same output line. However, the three color signals are different in time and are separate from each other.

In the case in which a single-pixel measuring unit is constructed of a single photoelectric conversion unit, the photoelectric conversion unit for each color measures a different point on a shear in color original so that the color registration becomes great. To eliminate shear in color registration, the photoelectric conversion units are grouped into units each constructed of M rows and N columns (M and N are integers which are at least 3), and a single-pixel measuring unit is constructed of M×N photoelectric conversion units. The same color charge signals of the photoelectric conversion units within the single-pixel measuring unit are read and added together so that a three-color separation measurement can be performed without any substantial hindrance of the exposure control for a color printer.

Figure 5:
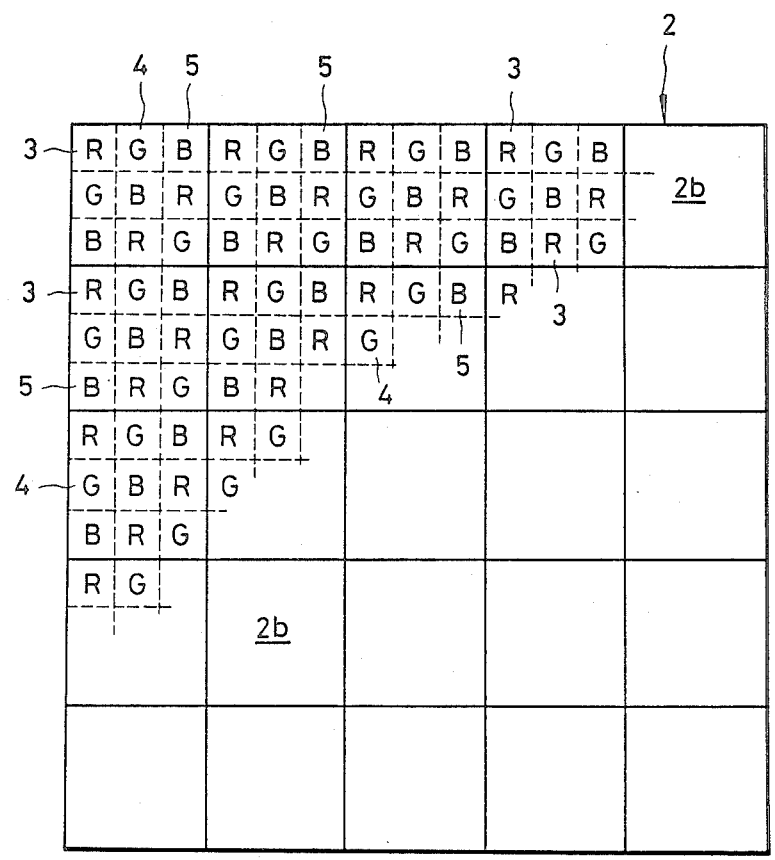
FIG. 5 is an explanatory view of an embodiment of the present invention wherein a single-pixel measuring unit is constructed of 3×3 photoelectric conversion units.

FIG. 5 shows an embodiment of the color image sensor wherein a single-pixel measuring unit is constructed of 9 or 3 rows and 3 columns of photoelectric conversion units. Elements identical to those in FIG. 1 have been designated by the same references. In this embodiment, a single-pixel measuring unit 2b is constructed of three red photoelectric conversion units 3, three green photoelectric conversion units 4 and three blue photoelectric conversion units 5. In FIG. 5, each photoelectric conversion unit 3 through 5 is bounded by a dotted line, while the single-pixel measuring unit 2b is enclosed by a solid line.

Figure 6:
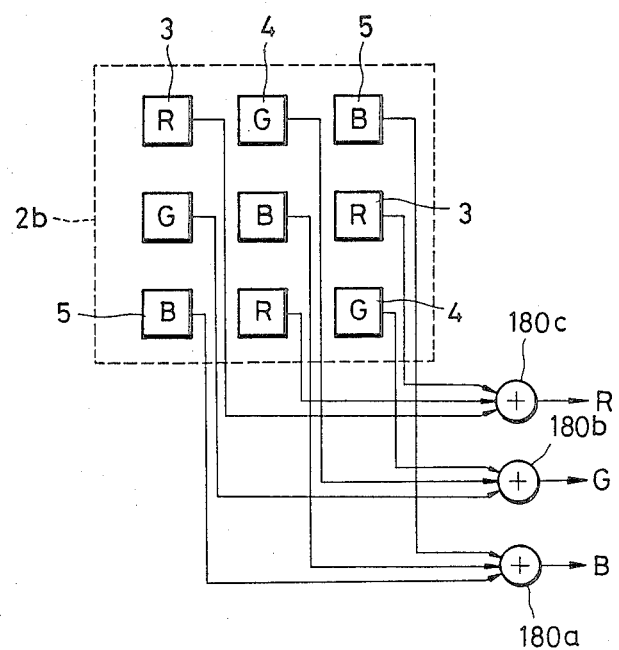
FIG. 6 is an explanatory view illustrating the principle of an embodiment of the present invention wherein charge signals for each color in a single pixel are added.

FIG. 6 is a schematic diagram illustrating the operating principle of the single-pixel measuring unit. The same color charge signals stored in the photoelectric conversion units within the single-pixel measuring unit 2b are simultaneously read and added together by an adder. In particular, the signals read out of three blue photoelectric conversion units 5 are added by an adder 180a, the signals read out of three green photoelectric conversion units 4 are added by an adder 180b, and the signals read out of three red photoelectric conversion units 3 are added together by an adder 180c. The adders 180a to 180c may be provided for each row or column of pixels, instead of each pixel. In addition, the adders may be mounted outside of the color image sensor 2.

Figure 7:
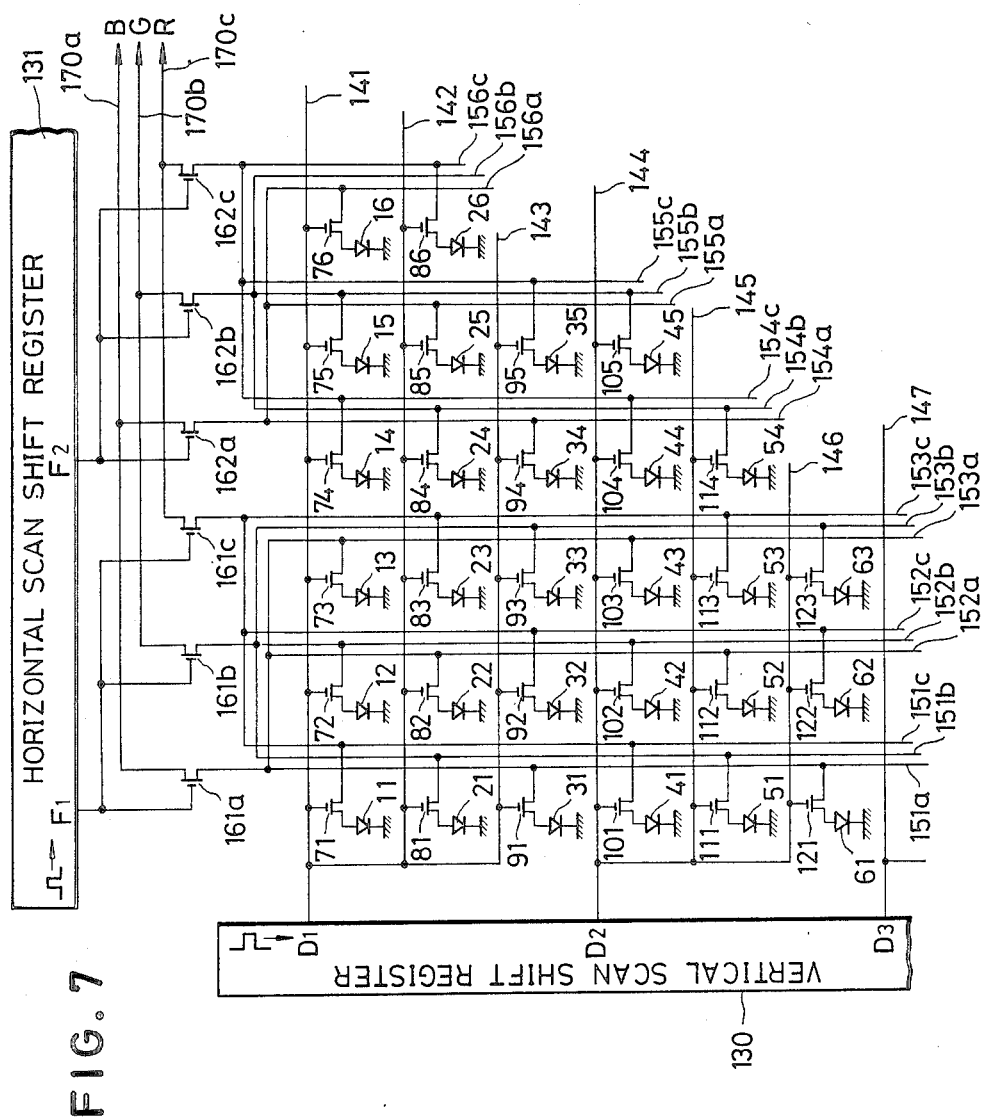
FIG. 7 is a particular circuit diagram embodying the principle of FIG. 6.

FIG. 7 is a particular circuit diagram for the embodiment shown in FIG. 6. The elements identical to those in FIG. 2 have been designated by the same reference numerals, and the elements used commonly for each color have been designated by the reference numerals omitting letters. In this embodiment, the single-pixel measuring unit 2b is constructed of three rows. Therefore, to simultaneously read the charge signals stored in the photodiodes within the single-pixel measuring unit and add them together, the upper three horizontal lines 141 to 143 are jointly connected to the first stage output terminal D1 of a vertical scan shift register 130. Similarly, the fourth to sixth horizontal lines 144 to 146 are jointly connected to the second stage output terminal D2 of the vertical scan shift register 130.

The single-pixel measuring unit 2b is also constructed of three columns. Therefore, blue vertical lines 151a, 152a and 153a are jointly coupled and connected serially to a blue horizontal MOS switch 161a. Similarly, green vertical lines 151b, 152b and 153b are jointly coupled and connected serially to a green color horizontal MOS switch 161b. Red vertical lines 151c, 152 and 153c are jointly coupled and connected serially to a red horizontal MOS switch 161c. The gates of these horizontal MOS switches 161a to 161c are connected to the first stage output terminal F1 of a horizontal scan shift register 131.

Similarly, to simultaneously read the charge signals for each color within the single-pixel measuring unit in the second column and add them together, there are provided a blue horizontal MOS switch 162a, green horizontal MOS switch 162b and red horizontal MOS switch 162c. The gates of these horizontal MOS switches 162a to 162c are connected to the second stage output terminal F2 of the horizontal scan shift register 131.

Next, the operation of the color image sensor of FIG. 7 will be described. For reading charge signals, first the vertical scan shift register 130 outputs a vertical scan pulse from the first stage output terminal D1. In this state, the horizontal scan shift register 131 sequentially outputs a horizontal scan pulse shifting from the output terminal F1 to the output terminal F2. First, when a horizontal scan pulse is outputted from the first stage output terminal F1, the horizontal MOS switches 161a to 161c turn ON, and the vertical MOS switches 71 to 73, 81 to 83, and 91 to 93 also turn ON. As a result, the charge signals are simultaneously read from the single-pixel measuring unit constructed of three rows and three columns. In this case, since the vertical lines are jointly connected for each color, the charge signals stored in the blue photodiodes 13, 22 and 31 are added together and outputted via the blue horizontal MOS switch 161a to a blue output line 170a. Simultaneously therewith, the charge signals stored in the green photodiodes 12, 21 and 33 are added together and outputted via the green horizontal MOS switch 161b to a green output line 170b. Also, the charge signals stored in the red photodiodes 11, 23 and 32 are added together and outputted via the red horizontal MOS switch 161c to a red output line 170c. Consequently, the charge signals stored in the photodiodes within the 3×3 single-pixel measuring unit are simultaneously read and added together for each color for outputting them in a color-separated state.

Subsequently, the horizontal scan shift register 131 outputs a horizontal scan pulse from the second stage output terminal F2 to simultaneously turn ON the horizontal MOS switches 162a to 162c. Accordingly, nine photodiodes of the single-pixel measuring unit in the first row and in the second column are scanned. The charge signals are added together for each color and the added signal is outputted in a color-separated state to the output lines 170a to 170c.

At the end of scanning of the horizontal shift register 131, the reading of the charge signals of the first row photodiodes within the single-pixel measuring unit is terminated. Next, the vertical scan shift register 130 outputs a vertical scan pulse from the output terminal D2. In this state, the horizontal shift register 131 scans once so that the single-pixel measuring unit of the second row is sequentially scanned starting from the first column. Thus, the charge signals of the photodiodes are added together and outputted. Similarly, the remaining photodiodes are scanned for each single-pixel measuring unit and the read-out signals are added together for each color and outputted to the output lines 170a to 170c.

Figure 8:
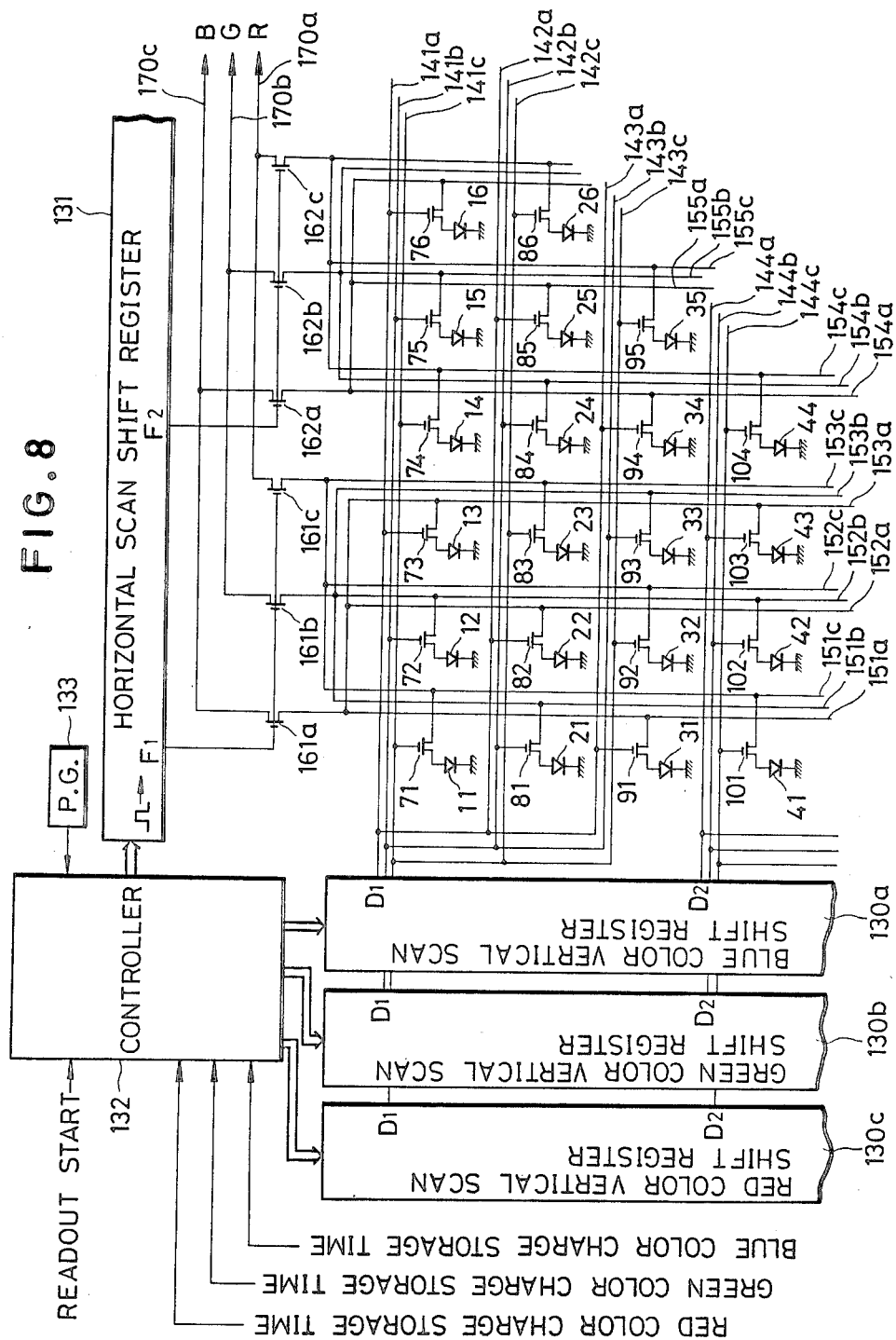
FIG. 8 is a circuit diagram of an embodiment of the present invention, wherein a single-pixel measuring unit is constructed of 3×3 photoelectric conversion units and the charge storage time for each color can be changed.

FIG. 8 is a modification of the circuit of FIG. 7, wherein the occurrence of shear in color registration is avoided and the charge storage time can be set as desired for each color. The identical elements to those in FIG. 2 have been designated by the same reference numerals. In this embodiment, to enable a readout of the charge signal independently of each color, a vertical scan shift register is provided for each color, i.e., there are provided a blue vertical scan shift register 130a, a green vertical scan shift register 130b and a red vertical scan shift register 130c. To read the charge signals in units of each single-pixel measuring unit 2b, blue horizontal lines 141a, 142a and 143a are jointly coupled and connected to the first stage output terminal D1 of the blue vertical scan shift register 130a. Similarly, green horizontal lines 141b, 142b and 143b are jointly coupled and connected to the first stage output terminal D1 of the green vertical scan shift register 130a. Red horizontal lines 141c, 142c and 143c are jointly coupled and connected to the first stage output terminal D1 of the red vertical scan shift register 130c. The connection arrangement of the single-pixel measuring unit of the second or any following row can be readily derived from that of the first row described above, so the description thereof is omitted. The connection arrangement of the vertical lines is the same as that of FIG. 7.

Similarly to the circuit of FIG. 2, in the circuit of FIG. 8, by driving any one of the vertical shift registers 130a to 130c at a desired readout timing, it is possible to control the charge storage time for each color and the added charge signals within the single-pixel measuring unit for that same color can be read. In case a concurrent readout of the charge signals occurs, the horizontal shift register is provided for each color as shown in FIG. 2.

In the above embodiments, the shift registers connected to the horizontal lines are called vertical scan shift registers, while the shift registers connected to the vertical lines are called horizontal scan shift registers. This designation, however, should be construed such that the terms "vertical and horizontal" only mean the relative position between the register and the line.

The present invention is not intended to be limited to the above embodiments, but various applications and modifications are possible without departing from the scope of the appended claims.

I claim:

1. In a color image sensor wherein a plurality of types of photoelectric conversion units are alternately disposed for photoelectrically converting different colors of light into a charge signal and storing the charge signal, and the stored charge signal in each of the photoelectric conversion units is read; the improvement comprising: read-out means (71, 72, 73, 130, 130a, 130b, 130c, 131, 131a, 131b, 131c, 141, 141a, 141b, 141c, 151, 151a, 151b, 151c, 161a, 161b, 161c, 170a, 170b and 170c) for each of said types of said photoelectric conversion units for reading said charge signals in a color-separated state, said plurality of types of photoelectric conversion units including a red photodiode (11) for storing a charge signal obtained through photoelectric conversion of red light, a green photodiode (12) for storing a charge signal obtained through photoelectric conversion of green light, and a blue photodiode (13) for storing a charge signal obtained through photoelectric conversion of blue light, wherein said photodiodes are arranged in a matrix grouped in units each constructed of M rows and N columns, wherein M and N are integers equal to at least three, and said readout means for each color read out the charge signals such that the charge signals of the photodiodes of each unit are read out simultaneously for all photodiodes of the same color within an individual unit.

2. A color image sensor according to claim 1, wherein said readout means comprises: blue vertical MOS switches (73, 82, 91) serially connected to said respective blue photodiodes (13, 22, 31); green vertical MOS switches (71, 81, 93) serially connected to said respective green photodiodes (12, 21, 33); red vertical MOS switches (71, 83, 92) serially connected to said respective red photodiodes (11, 23, 32); a blue horizontal MOS switch (161a) provided for said N columns and connected to a plurality of blue vertical MOS switches (73, 82, 91) in said N columns; a green horizontal MOS switch (161b) provided for said N columns and connected to a plurality of green vertical MOS switches (72, 81, 93) in said N columns; a red horizontal MOS switch (161c) provided for said N columns and connected to a plurality of red vertical MOS switches (71, 83, 92); a single vertical scan shift register (130) for sequentially turning on said blue, green and red vertical MOS switches (71 to 73), 81 to 83, 91 to 93) for said M rows; and a single horizontal scan shift register (131) for sequentially turning on said blue, green and red horizontal MOS switches 161a to 161c) for said N rows.

3. A color image sensor according to claim 2, wherein said integers M and N are 3.

4. A color image sensor according to claim 1, wherein said readout means comprises: blue vertical MOS switches (73, 82, 91) serially connected to said respective blue photodiodes (13, 22, 31); green vertical MOS switches (71, 81, 93) serially connected to said respective green photodiodes (12, 21, 33); red vertical MOS switches (71, 83, 92) serially connected to said respective red photodiodes (11, 23, 32); a blue horizontal MOS switch (161a) provided for said N columns and connected to a plurality of blue vertical MOS switches (73, 82, 91) in said N columns; a green horizontal MOS switch (161b) provided for said N columns and connected to a plurality of green vertical MOS switches (72, 81, 93) in said N columns; a red horizontal MOS switch (161c) provided for said N columns and connected to a plurality of red vertical MOS switches (71, 83, 92); a blue vertical scan shift register (130a) for sequentially turning on said blue vertical MOS switches (73, 82, 91) for said M columns; a green vertical scan shift register (130b) for sequentially turning on said green vertical MOS switches (72, 81, 93); a red vertical scan shift register (130c) for sequentially turning on said red vertical MOS switches (71, 83, 92); and a single horizontal scan shift register (131) for sequentially turning on said blue, green and red horizontal MOS switches (161a to 161c) for said N rows.

5. A color image sensor according to claim 4, wherein said integers M and N are 3.

6. In a color image sensor wherein a plurality of types of photoelectric conversion units are alternately disposed for photoelectrically converting different colors of light into a charge signal and storing the charge signal, and the stored charge signal in each of the photoelectric conversion units is read, wherein said plurality of types of photoelectric conversion units includes a red photodiode (11) for storing a charge signal obtained through photoelectric conversion of red light, a green photodiode (12) for storing a charge signal obtained through photoelectric conversion of green light, and a blue photodiode (13) for storing a charge signal obtained through photoelectric conversion of blue light, said photodiodes being arranged in a matrix; the improvement comprising: readout means for each of said types of said photoelectric conversion units for reading said charge signals in a color-separated state, said readout means comprising a red vertical MOS switch (71) serially connected to said red photodiode (11); a green vertical MOS switch (72) serially connected to said green photodiode (12); a blue vertical MOS switch (73) serially connected to said blue photodiode (13); a red horizontal MOS switch (161c) serially connected to said red vertical MOS switch (71); a green horizontal MOS switch (161b) serially connected to said green vertical MOS switch (72); a blue horizontal MOS switch (161a) serially connected to said blue vertical MOS switch (73); vertical scan means (130, 130a, 130b, 130c) for turning on said vertical MOS switches (71, 72, 73), said vertical scan means comprising a red vertical scan shift register (130c) for sequentially turning on said red vertical MOS switch one row after another, a green vertical scan shift register (130b) for sequentially turning on said green vertical MOS switch one row after another, and a blue vertical scan shift register (130a) for sequentially turning on said blue vertical MOS switch one row after another; and horizontal scan means (131, 131a, 131b, 131c) for turning on said horizontal MOS switches.

7. In a color image sensor wherein a plurality of types of photoelectric conversion units are alternately disposed for photoelectrically converting different colors of light into a charge signal and storing the charge signal, and the stored charge signal in each of the photoelectric conversion units is read, said plurality of types of photoelectric conversion units including a red photodiode for storing a charge signal obtained through photoelectric conversion of red light, a green photodiode for storing a charge signal obtained through photoelectric conversion of green light, and a blue photodiode for storing a charge signal obtained through photoelectric conversion of blue light, said photodiodes being arranged in a matrix; the improvement comprising: readout means for each of said types of said photoelectric conversion units for reading said charge signals in a color-separated state, said readout means comprising a red vertical MOS switch serially connected to said red photodiode; a green vertical MOS switch serially connected to said green photodiode; a blue vertical MOS switch serially connected to said blue photodiode; a red horizontal MOS switch serially connected to said red vertical MOS switch; a green horizontal MOS switch serially connected to said green vertical MOS switch; a blue horizontal MOS switch serially connected to said blue vertical MOS switch; vertical scan means for turning on said vertical MOS switches; and horizontal scan means comprising a red horizontal shift register sequentially turning on said red horizontal MOS switch one column after another; a green horizontal shift register for sequentially turning on said green horizontal MOS switch one column after another; and a blue horizontal shift register for sequentially turning on said blue horizontal MOS switch one column after another.

8. In a color image sensor wherein a plurality of types of photoelectric conversion units are alternately disposed for photoelectrically converting different colors of light into a charge signal and storing the charge signal, and the stored charge signal in each of the photoelectric conversion units is read, said plurality of types of photoelectric conversion units including a red photodiode for storing a charge signal obtained through photoelectric conversion of red light, a green photodiode for storing a charge signal obtained through photoelectric conversion of green light, and a blue photodiode for storing a charge signal obtained through photoelectric conversion of blue light, said photodiodes being arranged in a matrix; the improvement comprising: readout means for each of said types of said photoelectric conversion units for reading said charge signals in a color-separated state, said readout means including a red vertical MOS switch (71) serially connected to said red photodiode; a green vertical MOS switch serially connected to said green photodiode; a blue vertical MOS switch serially connected to said blue photodiode; a red horizontal MOS switch serially connected to said red vertical MOS switch; a green horizontal MOS switch serially connected to said green vertical MOS switch; a blue horizontal MOS switch serially connected to said blue vertical MOS switch; vertical scan means for turning on said vertical MOS switches; and horizontal scan means comprising a single horizontal scan shift register for simultaneously turning on said blue horizontal MOS switch, said green horizontal MOS switch and said red horizontal MOS switch.

* * * * *